United States Patent [19]

Rafi-Zadeh

[11] Patent Number: 4,832,359
[45] Date of Patent: May 23, 1989

[54] EXTENSIBLE COVER FOR THE BED OF A PICK-UP TRUCK HAVING A 5TH WHEEL TRAILER HITCH

[76] Inventor: Hassan Rafi-Zadeh, 5301 E. Mockingbird La., Paradise Valley, Ariz. 85253

[21] Appl. No.: 87,879

[22] Filed: Aug. 21, 1987

[51] Int. Cl.⁴ .............................................. B60J 7/10
[52] U.S. Cl. .................... 280/423.1; 150/166; 296/37.6; 296/100; 296/176
[58] Field of Search ............ 280/423 R; 296/100, 296/136, 37.1, 37.6, 37.14, 216, 220; 150/52 K, 52 R

[56] References Cited

U.S. PATENT DOCUMENTS

| 3,649,072 | 3/1972 | Cross | 296/200 |
| 3,675,885 | 7/1972 | Shute | 296/176 |
| 3,765,717 | 10/1973 | Garvert | 296/100 |
| 3,893,713 | 7/1975 | Ivy | 280/423 R |
| 3,936,077 | 2/1976 | Bliek | 280/423 R |
| 4,216,990 | 8/1980 | Musgrove et al. | 296/100 |
| 4,418,954 | 12/1983 | Buckley | 296/100 |
| 4,542,911 | 9/1985 | Mulligan | 280/423 R |
| 4,613,181 | 9/1986 | Rafi-Zadeh | 296/176 |
| 4,669,748 | 6/1987 | Le Vee | 280/423 R |
| 4,673,209 | 6/1987 | Rafi-Zadeh | 296/176 |
| 4,685,695 | 8/1987 | Le Vee | 280/423 B |

Primary Examiner—Charles A. Marmor
Assistant Examiner—Eric Culbreth
Attorney, Agent, or Firm—Cahill, Sutton & Thomas

[57] ABSTRACT

A vertically extensible cover assembly for the bed of a pick-up truck having a 5th wheel trailer hitch mounted in the bed thereof for allowing a trailer to be coupled, uncoupled and towed by the truck with the cover assembly mounted on the truck. The cover assembly includes a rigid cover which is mountable on the truck's bed by means of folding arms which allows the cover to be vertically extended for access to the truck's bed. A central opening is formed in the rigid cover through which the trailer hitch tongue during trailer towing operations and which is closed by a hatch during non-towing use of the truck. An open channel is provided in the rigid cover through which the trailer hitch tongue is movable during coupling and uncoupling of a trailer, with the open channel being closed by a lid structure when coupling and uncoupling operations are not being accomplished.

2 Claims, 3 Drawing Sheets

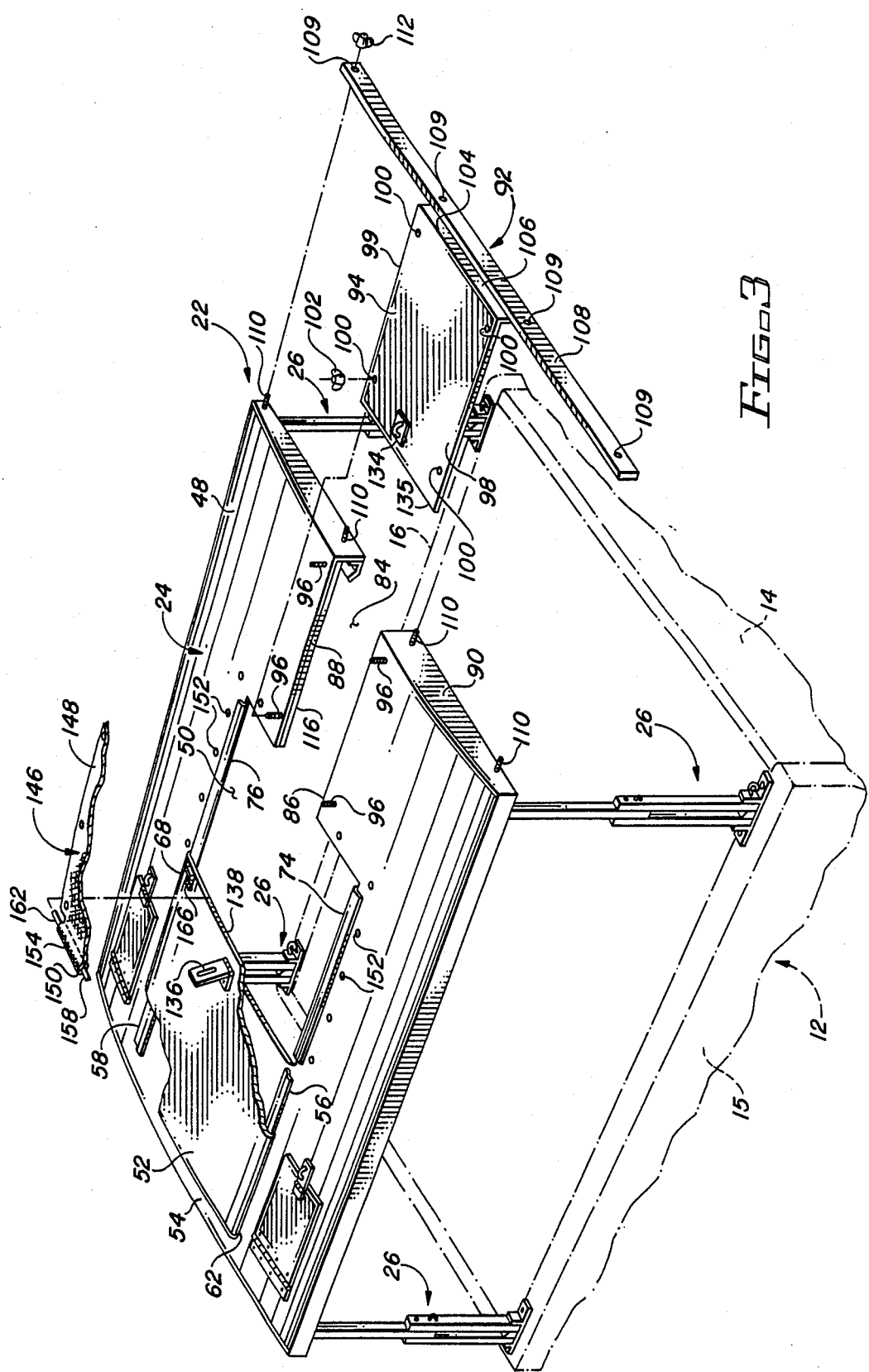

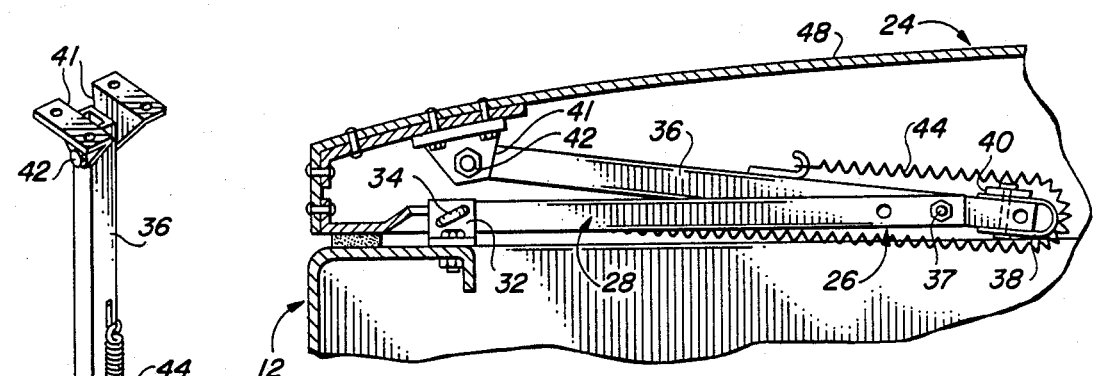
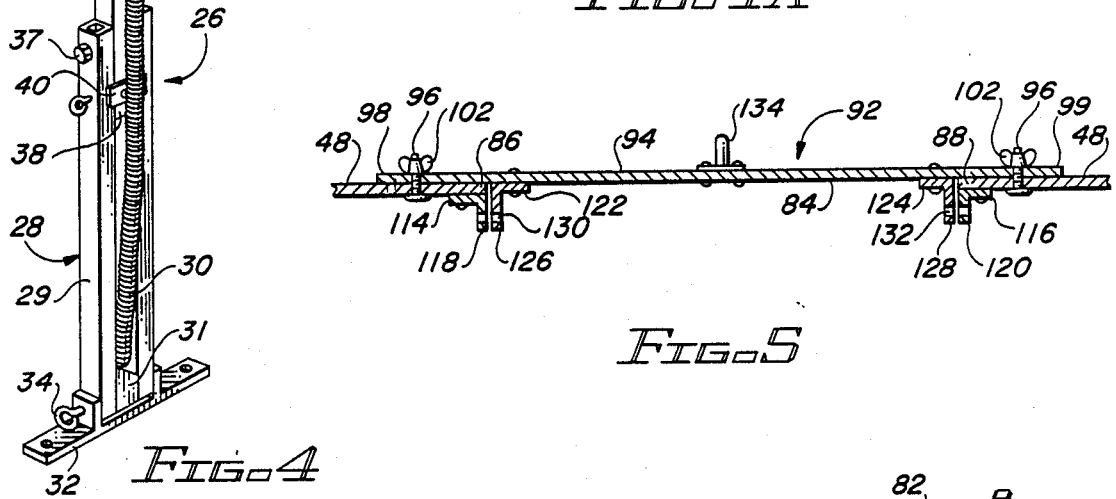
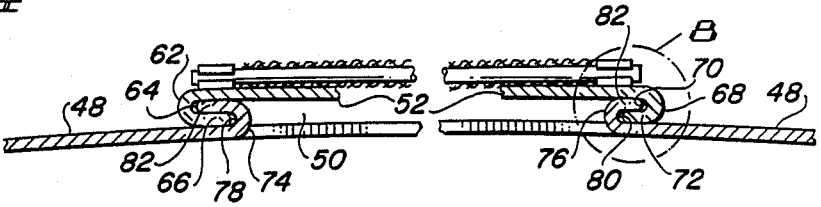
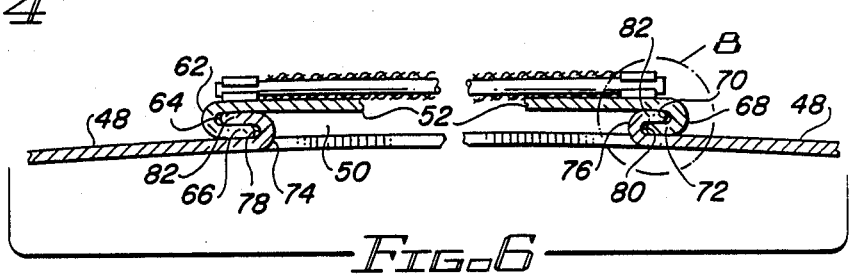
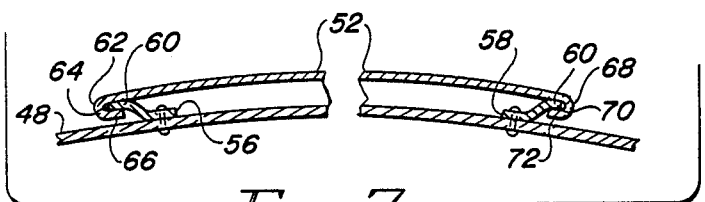
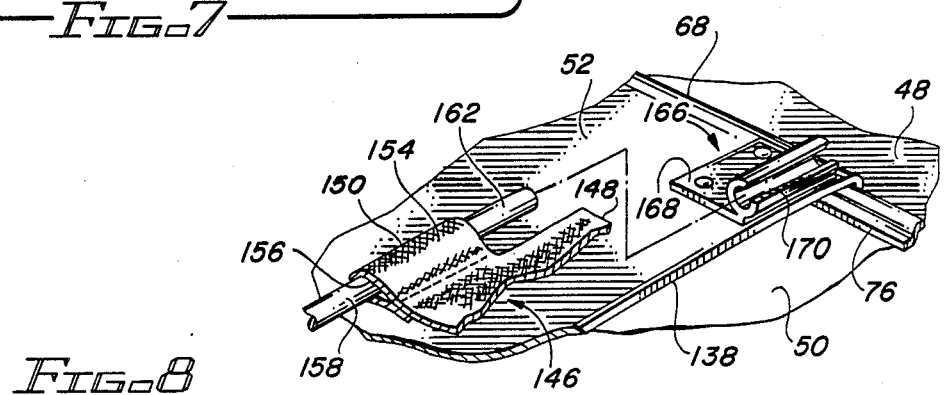

EXTENSIBLE COVER FOR THE BED OF A PICK-UP TRUCK HAVING A 5TH WHEEL TRAILER HITCH

BACKGROUND OF THE INVENTION

1. Field of the Invention

This invention relates in general to covers for the beds of pick-up trucks and more particularly to an extensible cover for use on the bed of a pick-up truck which has a 5th wheel trailer hitch mounted in the floor of the bed.

2. Description of the Prior Art

The prior art is replete with covers for pick-up truck beds ranging from canvas-like covers held in place by snaps to considerably more expensive and complex covers such as a rigid molded plastic cover which is hinged at the front end of the bed. The various types of covers all have some drawbacks. For example, the canvas-like covers mentioned above, sometimes referred to as a tonneau cover, provided virtually no security for articles contained in the bed other than hiding them from view. Also, the only way that relatively large articles, e.g. those which stick up above the sides of the bed, can be carried in a pick-up bed that is equipped with a tonneau cover is to remove the cover. The hinged plastic cover provides the desired security but does not make any provisions for carrying large objects. Also, these prior art covers all, more or less, present some problems with regard to access to the pick-up bed for insertion and removal of articles carried in the beds of the trucks.

A particular prior art bed cover which overcomes many of the problems usually associated with pick-up truck bed covers, is fully disclosed in U.S. Pat. No. 3,675,885; 4,613,181; and 4,673,209. These covers are in the form of a rigid structure which is attached by four special spring-loaded arms located at the corners of the bed of a pick-up truck. The arms are designed to fold inwardly relative to the bed of the pick-up truck and when all four arms are folded inwardly, the cover will be in its lowered position wherein it will be in resting engagement with the upper ledges of the bed and the cover is provided with means for being locked in its lowered position. By lifting one side or the other of the cover so as to unfold the two arms on the lifted side, the cover will be moved into a tilted partially elevated position so that access to the contents of the pick-up bed can be obtained from either side thereof. When both sides of the cover are lifted so as to unfold all four arms, the cover will, of course, be in the fully elevated position and this provides sufficient clearance for virtually any large objects. When the cover is fully elevated, the arms may be locked in their unfolded extended states to allow the pick-up to be driven with the cover elevated.

As is well known in the art, many pick-up truck owners are using what is commonly known as a 5th wheel trailer hitch for towing purposes, and several configurations of such hitches are commercially available. Briefly, a 5th wheel trailer hitch is a mechanism that is mounted in the bed of the truck and is often connected to the frame of the truck for strength reasons. When towing a trailer with such a hitch, the front end of the trailer overlays a large portion of the bed of the pick-up truck and the protruding hitch tongue of the trailer extends downwardly into the bed of the truck and is coupled to the 5th wheel hitch.

As a result of this coupling arrangement, none of the above described prior art pick-up bed covers can be used on a truck that is utilizing a 5th wheel trailer hitch for towing a trailer. If such a truck is not being used for towing, any of those prior art bed covers could, of course, be used. However, due to the inconvenice, and in many instances, the extreme difficulty associated with removing the bed cover each time the truck is to be used for towing, bed covers are never, to the best of my knowledge, used on trucks that are equipped with 5th wheel trailer hitches, and the beds of such trucks are left uncovered both during towing and non-towing usage.

Therefore, a need exists for a new and useful cover assembly for use on the bed of a pick-up truck which is equipped with a 5th wheel trailer hitch.

SUMMARY OF THE INVENTION

In accordance with the present invention a new and useful extensible cover assembly for the bed of a pick-up truck is disclosed, with the cover assembly being of the same basic type as disclosed in the hereinbefore mentioned prior art U.S. Pat. Nos. 3,675,885; 4,613,181; and 4,673,209; and being especially configured for use with a truck that has a 5th wheel trailer hitch.

Therefore, the cover assembly of the present invention includes a rigid cover which is attachable by four special spring-loaded arms to the upper corners of the pick-up truck bed. Each of the arms are foldable at a pivot joint intermediate their opposite ends and a counterbalancing spring is used to biasingly urge the arms to their unfolded positions. The arms are designed to fold inwardly relative to the bed of the pick-up truck, and when all four of the arms are folded, the cover will be in its lowered position wherein it will be in resting engagement with the upper ledges of the pick-up bed. By manually lifting one side or the other of the cover so as to unfold the two arms on the lifted side, with the aid of the counter-balancing springs, the cover will be moved into a tilted partially elevated position. This lifting of the cover assembly into a tilted position allows access to the contents of the pick-up bed from either side. When both sides of the cover are lifted so as to unfold all four arms, the cover will, of course, be in a fully elevated position to provide sufficient clearance for virtually any large object. When the cover is elevated, the arms may be locked in their unfolded positions to allow the pick-up truck to be driven with the cover elevated. When lowered, the cover may be locked to provide the desired security.

To allow the use of such a pick-up bed cover on trucks that are equipped with a 5th wheel trailer hitch, the rigid cover portion of the cover assembly of the present invention is of special configuration. The rigid cover portion is formed with a central opening through which the hitch tongue of the trailer extends when the trailer is coupled to the 5th wheel trailer hitch, and a reduced width open channel extends rearwardly from the central opening to the back edge of the cover for coupling and uncoupling purposes.

The trailers which are configured for towing by 5th wheel trailer hitches mounted in the beds of pick-up trucks have overhanging front ends and the hitch tongues of such trailers depend from the overchanging front ends. There are several basic types of hitch tongues, but they all depend from the front end of the trailers. Therefore, the central opening of the cover portion of cover assembly is provided to accommodate the hitch tongues, and has a width dimension which allows swivel movements of the tongue on the 5th wheel trailer hitch as occurs whenever the pick-up truck and trailer turn around a corner.

As is customary, when a pick-up truck having a 5th wheel hitch is to be coupled to a trailer, the tailgate of the truck is lowered and the truck is backed up under the overhanging front end of the trailer. When backing up in this manner, the depending hitch tongue of the trailer moves into the bed through the open tailgate into the vicinity of the 5th wheel hitch for coupling purposes. When uncoupling the trailer, the movement of the pick-up relative to the trailers' hitch tongue is reversed. The reduced width open channel which extends rearwardly from the central opening to the back edge of the rigid cover of the cover assembly of the present invention is provided to allow the coupling and uncoupling movements of the pick-up truck relative to the trailer.

A special lid structure is demountably carried on the back end of the cover for closing the open channel at all times except when coupling and uncoupling activities are taking place. Whenever a trailer is coupled to the 5th wheel hitch, the central opening remains open and a hatch structure is mounted atop the rigid cover for sliding movement between closing and opening positions relative to the central opening.

When the lid structure is mounted on the cover and the hatch structure is in its closed position, the cover assembly of the present invention provides the same security for the truck's bed as the cover assembly disclosed in the above referenced U.S. Patents and can be opened in the same manner by being moved into tilted positions from either side of the truck, or by being vertically extended. When a trailer is coupled to the 5th wheel hitch, the overhanging front end of the trailer will overlay the cover assembly and a relatively small clearance space exists therebetween. The actual clearance space will vary from trailer to trailer but in all instances, will not be great enough to allow the cover assembly to be opened in the above described tilting or vertically extensible manners. Therefore, the cover portion of the cover assembly is provided with at least one access hatch that may be opened to provide access to the pick-up bed whenever the truck is coupled to a trailer.

The same relatively small clearance spaced between the overlaying front end of the trailer and the cover portion of the cover assembly prevents access to the bed of the truck through the central opening of the cover. Therefore, the security features of the cover assembly of the present invention are not compromised when a trailer is coupled to the pick-up truck. However, rain water, dirt and dust can enter the pick-up bed through the central opening of the cover and for this reason, a fabric boot is provided for demountable attachment about the periphery of the central opening of the cover and the hitch tongue of the trailer.

Accordingly, it is an object of the present invention to provide a new and improved cover assembly for use on the bed of a pick-up truck which has a 5th wheel trailer hitch mounted in the bed thereof.

Another object of the present invention is to provide a new and useful cover assembly for use on a pick-up truck having a 5th wheel trailer hitch in the bed thereof, with the cover assembly being configured to permit coupling and uncoupling of the trailer to the 5th wheel hitch and towing of the trailer by the truck with the cover assembly in place on the bed of the truck.

Another object of the present invention is to provide a cover assembly of the above described character including a vertically extensible rigid cover which is mounted on the bed of the truck by means of spring-loaded folding arms with the rigid cover having a central opening through which the hitch tongue of the trailer extends when the trailer is coupled to the 5th wheel hitch provided in the bed of the truck with the rigid cover having a slide hatch for closing the central opening thereof during non-towing operations of the truck.

Another object of the present invention is to provide a cover assembly of the type described above which includes a fabric boot that is demountably attachable to the rigid cover about the central opening and to the hitch tongue of the trailer during towing operations of the truck.

Another object of the present invention is to provide a cover assembly of the above described character wherein the rigid cover has an open channel extending rearwardly from the central opening thereof for passage of the hitch tongue of the trailer during coupling and uncoupling activities and has a lid structure for closing of the open channel in the absence of coupling and uncoupling activities.

Still another object of the present invention is to provide a cover assembly of the above described type and further including at least one access hatch on the rigid cover to provide access to the bed of the pick-up truck whenever a trailer is coupled to the 5th wheel hitch of the truck.

The foregoing and other objects of the present invention as well as the invention itself, may be more fully understood from the following description when read in conjunction with the accompanying drawings.

BRIEF DESCRIPTION OF THE DRAWINGS

FIG. 3 is a perspective view of the cover assembly of the present invention with the cover being shown in the vertically extended position and having portions of the cover assembly shown in exploded relationship thereto.

FIG. 4 is a perspective view of a typical one of the spring-loaded folding arms of the cover assembly of the present invention with the arm being shown in its extended position.

FIG. 4A is a fragmentary sectional view showing the attachment of one of the folding arms to the cover and showing the arm in its folded position.

FIG. 5 is an enlarged fragmentary sectional view taken along the line 5—5 of FIG. 2.

FIG. 6 is an enlarged fragmentary section view taken along the line 6—6 of FIG. 2.

FIG. 7 is an enlarged fragmentary sectional view taken along the line 7—7 of FIG. 2.

FIG. 8 is an enlarged fragmentary exploded perspective view of the encircled portion of FIG. 6.

DESCRIPTION OF THE PREFERRED EMBODIMENT

Figure 1:
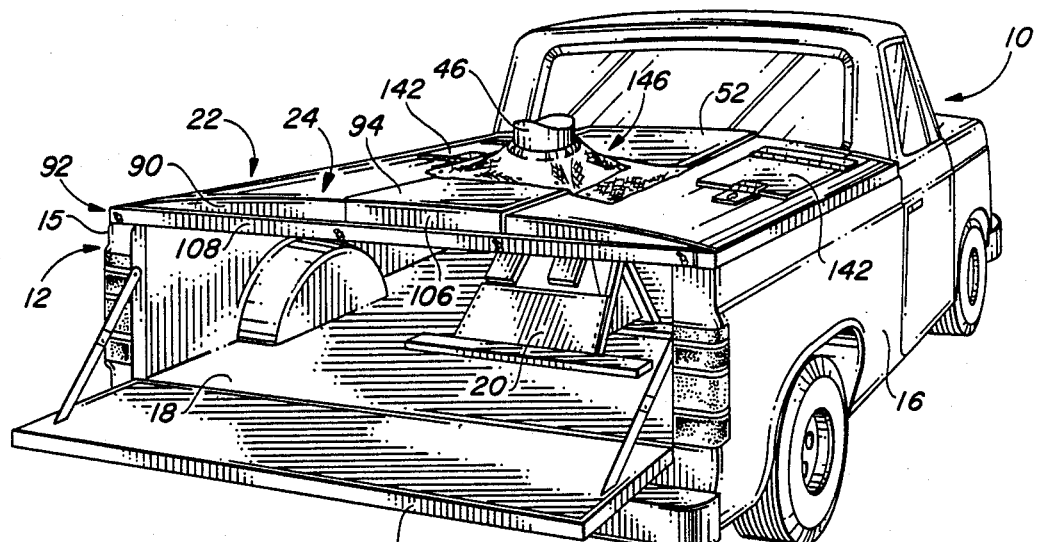
FIG. 1 is a perspective view of a pick-up truck having the extensible cover assembly of the present invention mounted on the bed thereof.

Referring more particularly to the drawings, FIG. 1 shows a typical pick-up truck 10 including the usual bed 12 and tailgate 14. The bed includes the usual side panels 15 and 16 and front panel (not shown), and floor 18. A 5th wheel trailer hitch 20 is mounted on the floor 18 of the bed 12, and a cover assembly of the present invention is mounted on the bed 12, with the cover assembly being indicated in its entirety by the reference numeral 22.

As is well known in the art, a 5th wheel trailer hitch is a mechanism which has come into wide usage in pick-up trucks in recent years. 5th wheel trailer hitches are commercially available in various configurations, and the one shown at 20 in FIG. 1 is intended to be indicative of all such devices.

As will hereinafter be described in detail, the cover assembly 22 includes the major components of a rigid cover structure 24, which is of special configuration for use with the 5th wheel trailer hitch 20, and four identical spring-loaded folding arms 26, as shown in FIGS. 3 and 4, which mount the rigid cover structure 24 on the bed 12 of the truck 10.

The rigid cover structure 24 is configured to match the open top of the pick-up truck's bed 12 and is therefore rectangular. Each of the folding arms 26 is suitably attached to a different corner of the cover 24 so as to depend therefrom into attached engagement with an aligned one of the corners of the bed 12 of the pick-up truck 10 as shown in FIG. 3.

A complete description of the folding arms 26 and the operation in conjunction with the cover structure 24, is presented in U.S. Pat. Nos. 3,675,885; 4,613,181; and 4,673,209; which are hereby incorporated by reference. However, to insure a complete understanding of the present invention and for completeness of this disclosure, a brief description of the folding arms 26 and their operational relationship with the cover structure 24 and the truck 10 will now be presented.

Since the four folding arms 26 are identical, the following description of the typical arm 26 shown best in FIG. 4, will be understood to apply to all of the arms. The folding arm 26 includes a bifurcated base leg 28 having a spaced apart pair of tines 29 and 30 the lower ends of which are connected by a tubular spacer 31. A mounting bracket 32 for attachment to the upper ledge of the pick-up bed 12 is mounted on the lower end of the bifurcated base leg 28 by means of a pivot pin 34. An extending leg 36 is pivotably mounted between the upper ends of the tines 29 and 30 of the base leg 28 by a pivot pin 37. The extending leg 36 has a bearing head 38 and a transverse stop plate 40 mounted on its proximal end, and a mounting bracket 41 for attachment to the underside of the cover structure 24 is mounted on the distal end of the extending leg 36 by a suitable pivot pin 42. An elongated tension spring 44 is connected between the extending leg 36 and the bifurcated base leg 28 of the folding arm 26 for biasing the arm 26 to its extended position shown in FIG. 4 and for counterbalancing purposes.

When all four of the arms 26 are in their unfolded extending positions, the rigid cover 24 will be in the elevated position shown in FIG. 3. When the arms 26 are folded inwardly in the manner shown in FIG. 4A, the cover structure 24 will be in its lowered position atop the ledge of the pick-up truck's bed 12 as shown in FIG. 1. Access to the pick-up bed 12 may be achieved from either side of the truck 10 by lifting one side or the other of the cover assembly 22 to unfold the arms 26 on the lifted side of the cover while the arms 26 on the non-lifted side remain folded. Of course, access can be achieved by lifting the entire cover assembly 22 to its vertically elevated position shown in FIG. 3.

As is well known in the art, a trailer which is configured for towing by a 5th wheel trailer hitch such as the one shown at 20 in FIG. 1, will have an overhanging front end (not shown) from which a hitch tongue as indicated at 46 in FIG. 1 depends. Due to this trailer and tongue configuration, the cover structure 24 of the cover assembly 22 of the present invention is especially configured to allow such a trailer to be coupled to the hitch 20 and towed by the truck 10 with the cover assembly 22 in place on the truck's bed 12.

Figure 2:
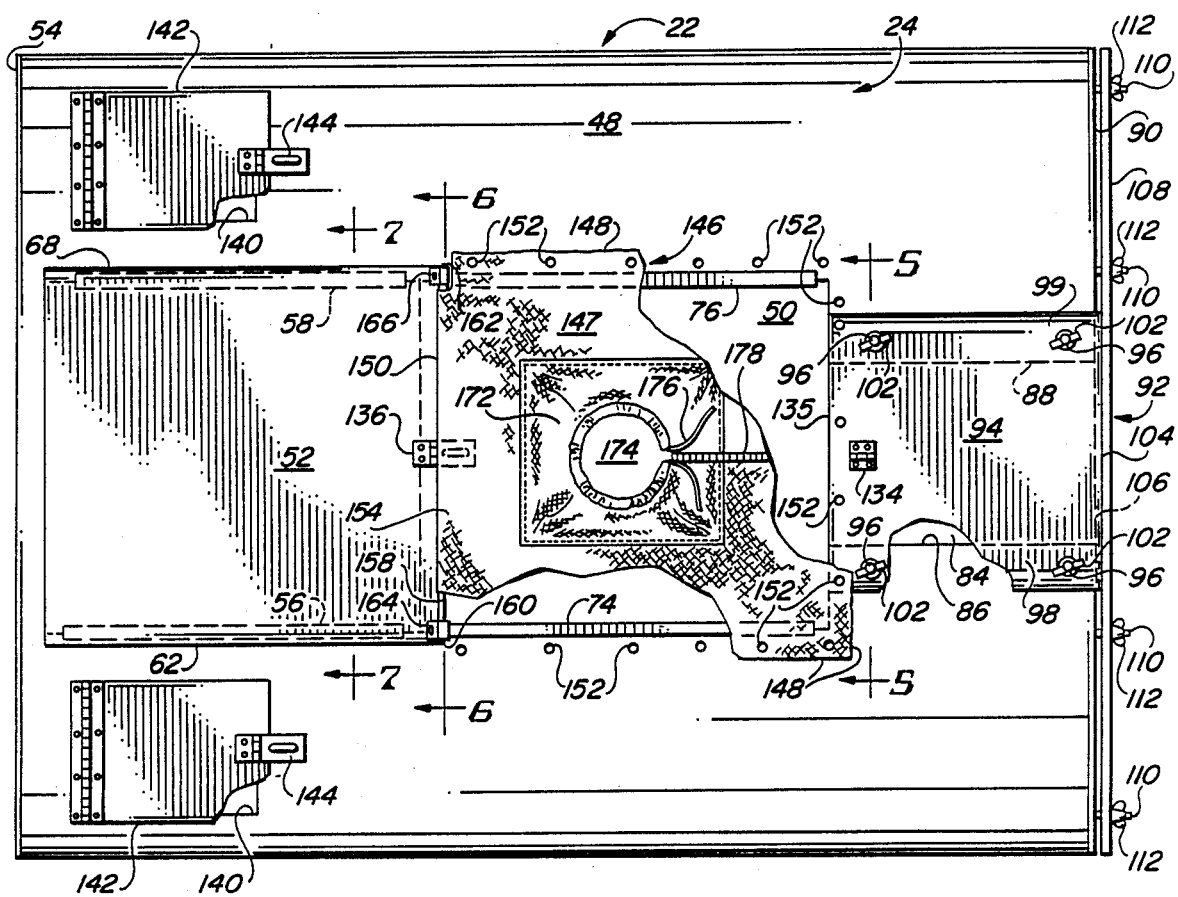
FIG. 2 is an enlarged plan view of the cover assembly of the present invention with portions thereof being broken away to show the various features thereof.

As seen best in FIGS. 2 and 3, the cover structure 24 includes an upper skin 48 which is preferably formed of sheet metal and is provided with a central opening 50 through which the trailer hitch tongue 46 (FIG. 1) extends during trailer towing activities. A hatch 52 in the form of a four sided panel is mounted on the top of the rigid cover 24 between the central opening 50 and the front end 54 of the cover. The hatch 52 is mounted for sliding movement from the illustrated position wherein the central opening 50 is open as it will be during trailer towing activities, to a position wherein the central opening 50 is closed as it should be whenever the hitch tongue 46 is not coupled to the 5th wheel trailer hitch 20.

As seen best in FIGS. 3 and 7, a pair of elongated rails 56 and 58 are riveted or otherwise attached to the upper skin 48 of the cover structure 24 for mounting and sliding movement of the hatch 52 on the cover structure 24. Each of the rails 56 and 58 is bent along its length to provide an upwardly spaced and oppositely facing lip 60 on each of the elongated rails. The side edge 62 of the hatch 52 is bent under to form an inwardly opening channel 64 having a lower flange 66 which is in hooked under engagement with the lip 60 of th rail 56 with the lip being disposed in the channel of the hatch 64. Similarly, the opposite side edge 68 of the hatch 52 is bent under to form the channel 70 having a lower flange 72 which is hooked under the lip 60 of the other rail 58 with the lip being disposed in the channel 70 of the hatch.

The opposite side edges 74 and 76 which define the central opening 50 of the cover structure 24, are bent back above the upper skin 48 to form outwardly opening channels 78 and 80 respectively, as seen best in FIG. 6. Each of the channels 78 and 80 have an upper flange 82 each of which is aligned with a different one of the lips 60 of the rails 56 and 58. Therefore, the channels 78 and 80 and the flanges 82 thereof, serve as forwardly extending continuations of the rails 56 and 58 for mounting and guiding the sliding movements of the hatch 52 between its closing and opening position relative to the central opening 50 of the cover structure 24.

As is well known in the art, coupling of a trailer (not shown) to a 5th wheel trailer hitch that is mounted in the bed of a pick-up truck is accomplished by opening the truck's tailgate and backing the truck under the overhanging front end of the trailer. This will bring the 5th wheel trailer hitch into position proximate the depending trailer hitch tongue of the trailer for coupling of the tongue to the hitch. Of course, uncoupling is accomplished by reversal of the coupling procedure, that is, disconnecting the tongue from the hitch and driving the truck out from under the front end of the trailer.

To allow such coupling and uncoupling activities, when the cover assembly 22 of the present invention is mounted on the bed 12 of the truck 10, a channel 84 is defined by the side edges 86 and 88 formed in the skin 48 of the cover structure 24 with its forward end opening into the central opening 50 of the cover and its back end opening onto the back edge 90 of the cover assembly.

The open channel 84 of the cover assembly 22, which may be of reduced width in comparison to the central opening 50, allows the depending trailer hitch tongue 46 (FIG. 1) to pass into and out of the bed 12 of the truck 10 during coupling and uncoupling operations, and therefore needs only to be open during such operations.

A closure assembly 92 is demountably mounted on the cover structure 24 for closing of the open channel 84 whenever coupling and uncoupling activities are not being accomplished. The closure assembly 92 includes a substantially planar lid plate 94 for mounting in overlaying relationship with respect to the channel 84. A plurality of studs 96 are fixedly mounted, such as by welding, in the upper skin 48 of the cover structure 24 so as to provide a row of such studs 96 in spaced relationship along each of the edges 86 and 88 which define the sides of the open channel 84. The width of the lid plate 94 is greater than the width of the open channel 84 to provide the lid plate 94 with side portions 98 and 99 that lie on the areas of the upper skin 48 which are proximate the edges 86 and 88, and those side portions are provided with suitable holes 100 for receiving the upstanding shanks of the studs 96 when the closure assembly 92 is mounted on the cover structure 24. Suitable fasteners, such as the illustrated wing nuts 102 are employed for demountably attaching the lid plate 94 to the cover structure.

The rearwardly disposed edge 104 of the lid plate 94 is bent down to provide a depending flange 106 which is riveted, welded or otherwise affixed to an elongated strap 108 intermediate its opposite ends. The strap 108 is provided with holes 109 for receiving the shanks of studs 110 which are carried in the back edge 90 of the cover structure 24, with suitable wing nuts 112 being used to demountably attach the strap 108 to the back edge 90 of the cover. The strap 108 is employed to rigidify the cover structure 24 which in the absence of the strap, would be undesirably weak due to the formation of the central opening 50 and the channel 84 therein.

As seen in FIG. 5, the edges 86 and 88 of the cover 24, which define the open channel 84, are reinforced by elongated L-shaped channel beams 114 and 116 which are riveted to the underside of the skin 48 at those edges, with the beams 114 and 116 providing depending flanges 118 and 120. A pair of L-shaped brackets 122 and 124 are similarly riveted or otherwise attached to the underside of the lid plate 94 to provide a depending flange 126 which is adjacent the flange 118 of the beam 114 and a depending flange 128 which is adjacent the flange 120 of the other beam 116. An aligned pair of apertures 130 are formed in the flanges 118 and 126 of the beam 114 and bracket 122 for receiving a suitable padlock (not shown), and a similar pair of apertures 132 are formed through the flanges 120 and 128 of the beam 116 and bracket 124 for receiving another padlock (not shown). Therefore, the closure assembly 92 may be locked in place to prevent unauthorized access to the bed 12 of the truck 10 through the channel 84 of the cover structure 24.

The lid plate 94 has a staple 134 mounted proximate its forward edge 135 which cooperates with a hinged hasp 136 that is mounted proximate the rearwardly disposed end edge 138 of the slide hatch 52 for locking the hatch 52 in its closed position whenever the trailer hitch tongue 46 is not connected to the 5th wheel hitch 20.

Therefore with the central opening 50 being closed by the hatch 52 and the channel 84 being closed by the closure assembly 92, with the hatch and closure being locked in the the above described manner, the cover assembly 22 of the present invention will provide the same security and access benefits of the covers disclosed in the hereinbefore referenced U.S. Patents.

Whenever a trailer (not shown) is coupled to the 5th wheel trailer hitch 20, the overhanging front end (not shown) of the trailer will overlay a portion of the cover assembly 22 and the relatively small spacing therebetween will prevent tilting or fully elevated opening of the cover structure 24. To overcome this lack of access to the bed 12 whenever a trailer is coupled to the hitch 20, the cover structure 24 may be provided with two or more access openings such as those indicated at 140 in FIG. 2. The access openings 140 are closed by hinged lids 142 which may be locked in their closed positions by means of suitable hasp and staple assemblies 144 as shown.

The above mentioned spacing between the cover assembly 22 and the overhanging front end (not shown) of the trailer that is coupled to the 5th wheel trailer hitch 20, will prevent unauthorized access to the bed of the truck 10 through the central opening 50 of the cover which must be open due to the trailer hitch tongue 46 extending through the opening 50 into coupled engagement with the 5th wheel trailer hitch 20. Although this arrangement will prevent unauthorized access to the bed 12 of the truck, it will not prevent the passage of rain, snow, dirt, and the like, through the central opening 50 of the cover assembly 22.

For this reason, the cover assembly 22 advantageously further includes a boot assembly 146 which has a substantially planar sheet 147 that is formed of canvas, vinyl or any other suitable weatherproof fabric-like material. The planar sheet 147 is of essentially the same shape as the central opening 50 of the cover structure 24, i.e. square in the illustrated embodiment, but is somewhat larger to provide overlapping side and back edges, as shown at 148 in FIG. 2, and an especially configured front edge 150. The opposed side edges 148 of the sheet 147 overlap and are demountably attached to the skin 48 of the cover structure 24 adjacent the side edges 74 and 76 which define the central opening 50, by suitable fastener means such as the illustrated snaps 152. The rear edge 148 of the sheet 147 similarly overlaps the forward edge 135 of the lid plate 94 and the laterally adjacent portions of the cover's skin 48, and is demountably attached thereto by the snaps 152. The special front edge 150 of the boot sheet 147 may, of course, be demountably attached such as by snaps (not shown), but is instead of special configuration which facilities installation and removal of the boot assembly.

As seen best in FIG. 8, the front edges 150 of the planar sheet 147 of the boot assembly 146, is folded back on itself and sewn, or otherwise fixed in that position to provide an elongated looped over hem 154 which defines a passage 156 having a dowel 158 therein. The opposite ends 160 and 162 of the dowel 158 extend from the hem 154 for demountably engaging an identical pair of brackets 164 and 166 that are mounted at opposite ends of the rearwardly disposed end edge 138 of the slide hatch 52.

Each of the brackets 164 and 166 include a mounting plate 168 which is riveted or otherwise attached to the slide hatch 52, and have an open ended longitudinally slotted tube 170 formed integrally on one end of the plate 168. The protruding ends 160 and 162 of the dowel 158 may be axially inserted or removed from the bores of the tubes 170 of their respective ones of the brackets 164 and 166, but they are preferably pushed in a lateral direction through the slots of the tubes 170 for simplified attachment and precise positioning of the boot assembly 146.

The boot assembly 146 further includes a collar portion 172 which is formed centrally in the planar sheet 147 and is preferably fabricated of a material similar to that used to make the sheet. The collar portion 172 is configured to have a central opening 174 with a drawstring 176 surrounding the opening for pulling it tight around the trailer hitch tongue 46 (FIG. 1) in the well known manner. A zipper 178 is provided in the collar 172 and the sheet 147 for closing the boot assembly in a wrapped around position about the hitch tongue.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. An openable cover assembly for use on the bed of a pickup truck which has a 5th wheel trailer hitch in the bed for coupling to a hitch tongue of a trailer to be towed, said cover assembly comprising:
   (a) a rigid cover of rectangular configuration having a front, a back and an opposed pair of side edges;
   (b) means on said rigid cover, for attachment thereof to the bed of the truck and for allowing selective opening and closing of said rigid cover;
   (c) said rigid cover defining a central opening through which the hitch tongue extends into coupling engagement with the 5th wheel trailer hitch when the trailer is to be towed by the truck;
   (d) hatch means mounted on said rigid cover for selective opening and closing of the central opening of said rigid cover;
   (e) said rigid cover defining an open channel which extends from the central opening to the back edge of said rigid cover with the hitch tongue being movable through the open channel during trailer coupling and uncoupling operations; and
   (f) closure means demountably attached to said rigid cover for selective opening and closing of the open channel of said rigid cover, said closure means including:
      (i) a lid plate in overlaying relationship with the open channel of said rigid cover, said lid plate having a back edge which is proximate the back edge of said rigid cover;
      (ii) an elongated strap attached to the back edge of said lid plate; and
      (iii) fastener means for demountably attaching said lid plate in overlaying relationship with respect to the open channel of said rigid cover and for demountably attaching said elongated strap to the back edge of said rigid cover.

2. A vertically extensible cover assembly for use on the bed of a pickup truck which has a 5th wheel trailer hitch in the bed for coupling to a hitch tongue of a trailer to be towed, said cover assembly comprising:
   (a) a rigid cover of rectangular configuration having a front, a back and an opposed pair of side edges;
   (b) four folding arms each depending from a different corner of said rigid cover for attachment to different corners of the bed of the truck, said folding arms having folded positions wherein said cover is in a bed closing position and unfolded positions wherein said cover is elevated relative to the bed of the truck;
   (c) said rigid cover defining a central opening through which the hitch tongue extends into coupling engagement with the 5th wheel trailer hitch when the trailer is to be towed by the truck;
   (d) hatch means mounted on said rigid cover for selective opening and closing of the central opening of said rigid cover;
   (e) said rigid cover defining an open channel which extends from the central opening to the back edge of said rigid cover with the hitch tongue being movable through the open channel during trailer coupling and uncoupling operations; and
   (f) closure means demountably attached to said rigid cover for selective opening and closing of the open channel of said rigid cover, said closure means including:
      (i) a lid plate in overlaying relationship with the open channel of said rigid cover, said lid plate having a back edge which is proximate the back edge of said rigid cover;
      (ii) an elongated strap attached to the back edge of said lid plate; and
      (iii) fastener means for demountably attaching said lid plate in overlaying relationship with respect to the open channel of said rigid cover and for demountably attaching said elongated strap to the back edge of said rigid cover.

* * * * *